UNITED STATES PATENT OFFICE.

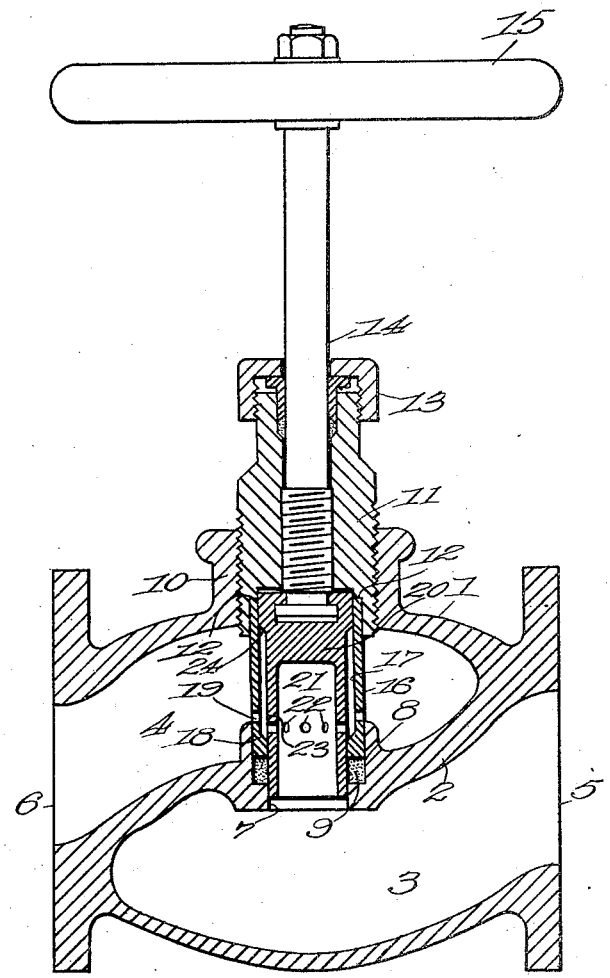

HERMANN BRAUNER, OF JÄGERNDORF, AUSTRIA-HUNGARY.

VALVE.

No. 878,183.

Specification of Letters Patent.

Patented Feb. 4, 1908.

Application filed January 22, 1906. Serial No. 297,302.

*To all whom it may concern:*

Be it known that I, HERMANN BRAUNER, a subject of the Emperor of Austria-Hungary, residing at Jägerndorf, Schlesien, Austria-Hungary, have invented certain new and useful Improvements in Valves, of which the following is the specification.

This invention relates to improvements in valves of that type comprising a casing provided with a diaphragm forming two compartments, communicating respectively with the inlet and outlet of the valve casing, and a valve stem having threaded connection with a packing gland member and adapted to operate a valve piston whereby communication may be established or cut off between said compartments in the operation of opening and closing the valve.

The invention has to do more particularly with an improved structure of this general type wherein the parts are so arranged and designed as to permit the employment of a suitable packing for the piston, to prevent leakage from one compartment to the other, and to permit of tightening the packing by either operating the gland member or the valve stem.

The invention will be more fully described in connection with the accompanying drawings and will be more particularly pointed out and ascertained in and by the appended claims.

In the drawings:—the figure as shown illustrates in vertical section one embodiment of my invention.

As shown 1, designates as a whole a valve casing which is divided by a diaphragm 2, into compartments 3 and 4, communicating respectively with the inlet and the outlet 5 and 6 of said valve. The said diaphragm is provided with an opening or passage 7, having a recessed portion 8, adapted to receive a suitable packing indicated at 9. At its upper end said casing 1, is provided with an internally threaded extension 10, in which is fitted a gland member 11 which is externally threaded to permit of its adjustment in said casing. Said member 11 is desirably recessed at its lower end and is provided with an annular shoulder 12 the purpose of which will hereinafter more fully appear. At its upper end the member 11 is provided with the usual gland 13 to afford means for making a tight joint with a valve stem 14. Said stem 14 is provided with the usual operating member which as shown is in the form of a hand-wheel 15 and is provided with external threads for engagement with the gland member 11 whereby adjustment of the valve stem may be effected for the purpose of opening and closing the valve.

A cylinder 16 is adapted to be interposed between the shoulder 12 and the packing 9 and conveniently said cylinder extends into said recessed portion 8 a slight distance.

It will be readily seen that by adjusting the gland member 11 the packing 9 may be compressed or allowed to expand in accordance with the requirements. The cylinder 16 is preferably internally recessed as at 17 and is provided with a shoulder 18 adjacent to the lower portion of the recess the purpose of which will hereinafter more fully appear. Openings 19 are provided in the cylinder 16 and are so disposed as to be normally open. A piston 20 is slidably mounted in said cylinder and is connected with the valve stem 14 at its upper end in a manner to permit rotation of the stem without imparting rotative movement to the piston as will clearly be understood by reference to the drawing. The piston 20 is of a hollow construction as indicated at 21 and is provided with openings 22 adapted to communicate with openings 19 and open the valve when the piston is in the position shown and adapted to close said valve when the piston is in a position to bring the openings 22 adjacent the packing 9. Said piston 20 is externally recessed at 23 to form with said cylinder recess an annular chamber and at the upper end of said recess the piston is provided with an annular shoulder 24 adapted for engagement with the shoulder 18. Will be obvious that by lowering the piston 20 and forcing the shoulder 24 into engagement with the shoulder 18 the packing can be tightened if for example the valve is to be closed for an extended period of time or for other purposes which may arise in practice.

I claim:—

1. A valve comprising in combination a casing provided with a diaphragm forming two compartments communicating with the inlet and the outlet of the valve, said diaphragm having a centrally disposed passage provided with a recessed portion for receiving packing, a cylinder fitting in said recessed portion upon said packing, said cylinder being provided with apertures and an internal recessed portion, a gland member for said casing engaging the upper portion of said cylinder, a piston valve closure externally recessed to form with said cylinder recess an annular chamber, said cylinder and piston closure having shoulders adapted for engagement and said piston closure having apertures communicating with said annular chamber, and a valve stem for operating said piston closure.

2. A valve comprising in combination, a casing provided with a diaphragm forming two compartments communicating respectively with the inlet and outlet of said valve, said diaphragm having a passage provided with a recessed portion for receiving packing, a cylinder fitting in said recessed portion upon said packing and provided with apertures, a gland member for said casing engaging the upper portion of said cylinder, a piston valve closure having apertures communicating with said cylinder apertures, said cylinder and piston having abutting shoulders whereby said packing may be tightened, and means for operating said piston.

3. A valve comprising in combination, a casing provided with a diaphragm forming two compartments communicating respectively with the inlet and outlet of said valve, said diaphragm having a passage provided with a recessed portion for receiving packing, a cylinder fitting in said recessed portion upon said packing and provided with an internally recessed portion and apertures, a piston valve closure externally recessed to form with said cylinder recess an annular chamber and having apertures communicating with said cylinder apertures through said chamber, and means for operating said piston.

4. A valve comprising in combination, a casing provided with a diaphragm having a recessed portion for receiving packing, a cylinder fitting in said recessed portion upon said packing, means for engaging said cylinder to tighten said packing, a piston slidably mounted in said cylinder, and means whereby movement of said piston may serve to tighten said packing.

In testimony whereof I affix my signature in presence of two witnesses.

HERMANN BRAUNER.

Witnesses:
  ALVESTO S. HOGUE,
  T. KNÖPFELMACHER.